(12) United States Patent  (10) Patent No.: US 7,416,436 B2
Togami et al.  (45) Date of Patent: Aug. 26, 2008

(54) COMPACT INTERFACE MODULE

(75) Inventors: Chris K. Togami, San Jose, CA (US); James Stewart, San Jose, CA (US)

(73) Assignee: Finisar Corporation, Sunnyvale, CA (US)

( * ) Notice: Subject to any disclaimer, the term of this patent is extended or adjusted under 35 U.S.C. 154(b) by 920 days.

(21) Appl. No.: 10/391,140

(22) Filed: Mar. 17, 2003

(65) Prior Publication Data

US 2007/0173101 A1  Jul. 26, 2007

(51) Int. Cl.
 *H01R 13/00* (2006.01)
(52) U.S. Cl. .................................................... 439/484
(58) Field of Classification Search ................. 439/142, 439/676, 620, 607, 484; 385/88–92
 See application file for complete search history.

(56) References Cited

U.S. PATENT DOCUMENTS

| 5,169,346 | A | * | 12/1992 | Johnston ..................... 439/676 |
| 5,901,263 | A | * | 5/1999 | Gaio et al. .................... 385/92 |
| 6,439,918 | B1 | | 8/2002 | Togami et al. |
| 6,554,638 | B1 | * | 4/2003 | Hess et al. .................. 439/490 |
| 6,556,446 | B1 | * | 4/2003 | Hwang ........................ 361/728 |
| 6,568,966 | B1 | * | 5/2003 | Korsunsky et al. .......... 439/676 |
| 6,840,816 | B2 | * | 1/2005 | Aekins ........................ 439/676 |
| 6,848,943 | B2 | * | 2/2005 | Machado et al. ............ 439/607 |
| 2003/0021552 | A1 | | 1/2003 | Mitchell |

* cited by examiner

*Primary Examiner*—Briggitte R Hammond
(74) *Attorney, Agent, or Firm*—Workman Nydegger

(57) ABSTRACT

The invention pertains to a compact connector that accommodates a standard cable connector. By reducing the number of components at the interface, the invention allows a small form factor module to accommodate a cable connector that has thus been accommodated only by modules having larger dimensions. The device of the invention includes an electrically conductive lead protruding from a first outer surface of a connector housing and a shell disengageably coupled to the connector housing so as to form a cavity with the lead positioned therein, wherein the first outer surface forms an inner wall of the cavity. The invention also pertains to a module containing electrical components, including a lead, and a shell designed to hold a cable connector in contact with the lead. If the shell is made of a material that blocks electromagnetic radiation, the compact connector also serves as an EMI shield.

20 Claims, 10 Drawing Sheets

COMPACT INTERFACE MODULE

BACKGROUND

The invention relates generally to electronic modules and particularly to electronic transceiver modules of small form factor.

Communication systems are widely employed for a variety of purposes ranging from a basic transmission line in public communication channel to a short-distance network such as a LAN (local area network). These systems include various electronic devices that are interconnected with signal carrying media, such as fiber optic cables or electronic cables. Often, at the interface of a cable and a device is one or more transceivers that receive signals from the cable and forward them to the host device, or receive signals from the host device and forward them to the cable.

A transceiver, unlike a simple connector, serves as an interface converter. For example, fiber optic transceivers convert high-speed electrical signals and convert them to high-speed optical signals. An electronic transceiver that can function as a pass-through, an amplifier, or a reformatter of the electronic signal in such a way as to allow it to transmit over longer distances (serial to parallel conversion) also exist.

Transceivers are typically designed to be electrically and/or optically coupled to a host device and to a network. Typically, transceivers are packaged in the form of a module that has a host device end and a network end. At the host device end, the transceiver module may be mounted on a motherboard of a host device and/or mechanically plugged into a panel that is coupled to the host device. At the network end, the transceiver module is mechanically coupled with a cable connector. There are a number of different connector standards that have been used in the past and have evolved into industry standards. These connector standards include but are not limited to MT-RJ, LC, and SC connectors for optical cables, and RJ-45, RJ-11 and BNC for electrical cables. RJ-45 connectors, which are commonly used with Category 5 cables, are the generally preferred electronic cable/connector systems in most LANs. For pluggable modules, the panel of the host device usually has one or more openings that can accommodate standard sized transceiver modules configured with one of these standard connection interfaces.

Standard modules (e.g., MSA standards) include GBIC modules and, more recently, Small Form Factor Pluggable (SFP) modules, both of which are well known in the industry. SFP modules are becoming increasingly preferred over GBIC modules for their smaller size. As communication systems evolve to require more bandwidth, higher module density is needed at the host device panel, calling for smaller modules. Currently, however, use of SFP modules are limited by the fact that they are not large enough to accommodate many standard cable connectors. Since GBIC modules can accommodate larger cable connectors, e.g., an RJ-45 connector jack, the industry is often forced to use GBIC modules even if SFP modules would be more advantageous. Clearly, an SFP module that can accommodate standard cable connectors is needed. However, because the size of a standard cable connector such as an RJ-45 connector is large relative to the small dimensions of SFP, designing an SFP module that can accommodate an RJ-45 connector jack has been challenging.

FIG. 1 depicts a conventional connector jack 10 that is used to mechanically connect a larger module (e.g., a GBIC module) to a cable connector 11. The connector jack 10 includes a set of electrically conductive leads 14 that are partially enclosed in the jack's plastic housing 16 such that the ends are exposed. A first exposed region 12 of the leads are designed to be coupled to a printed circuit board (not shown) while a second exposed region 14 of the connectors are designed to be coupled with the cable connector 11. The first exposed region 12 may be located on any part of the plastic housing 16 as is convenient for coupling to a printed circuit board. The second exposed region 14 are positioned inside a cavity 18 of the plastic housing 16 such that when the cable connector 11 is inserted into the cavity 18, connection(s) will be established between the printed circuit board and the cable. The cavity 18 is sized and shaped to accommodate a standard cable connector, such as an RJ-45 connector used with a CAT-5 cable. The sidewalls of the plastic housing 16 have to be rigid enough to hold the cable connector 11 in place, and the rigidity requires that the cavity 18 be enclosed by walls of a certain minimum thickness x. Naturally, the size and shape of the plastic housing 16 is dictated largely by the dimensions of the cable connector 11.

FIG. 2 depicts a manner in which the conventional connector jack 10 and the printed circuit board are assembled into a conventional GBIC module 20 by being placed inside a metal shell. The connector jack 10 is coupled to a printed circuit board 22 by any of the well-known and suitable means (e.g., a ribbon connector 24), and this connector-board combination is enclosed by a lower shell 26 and an upper shell 28. The lower shell 26 and the upper shell 28, which are made of a material that shields electromagnetic radiation, are attached firmly to each other with screws 29. The metal shells 26, 28 protect the electrical components of the transceiver 20 and shield electromagnetic radiation. A connector cover 26a of the lower module shell 26 and a connector cover 28a of the upper module shell 28 are designed to surround the connector jack 10, further shielding electromagnetic radiation.

FIG. 3 depicts the GBIC module 20 that is assembled in the manner shown in FIG. 2. The assembled GBIC module 20 is substantially encapsulated with the metal shield 26, 28 except for the cavity 18 at the network end and an opening (not shown) at the host end 29. As described above, the GBIC module 20 uses separate mechanisms for holding the cable connector (i.e., plastic housing 16) and for shielding electromagnetic radiation (i.e., the metal shell 26, 28). As both of these functions are usually needed and the dimensions of the plastic housing 16 alone are larger than the dimensions of the entire connector end of an SFP module as dictated by MSA, today's SFP modules are not compatible with standard RJ-45 cable connectors. However, as stated above, there is an increasing need for an SFP module that can accommodate an RJ-45 cable connector.

BRIEF SUMMARY OF THE INVENTION

The invention pertains to a compact electrical interface device. The electrical connector of the invention includes an electrically conductive lead protruding from a first outer surface of a plastic housing and a shell disengageably coupled to the plastic housing so as to form a cavity with the lead positioned therein, wherein the first outer surface forms an inner wall of the cavity. The invention also pertains to a module containing electrical components, including a lead, and a shell designed to hold a cable connector in contact with the lead. The shell may be made of metal, in which case the shell serves both the function of a connector and the function of an electromagnetic radiation shield. Another aspect of the invention is a method of connecting electrical components to a network by partially enclosing an electrical lead with a shell and shaping the shell to hold a cable connector in contact with the electrical lead.

DETAILED DESCRIPTION OF THE PREFERRED EMBODIMENT

The present invention is directed to a transceiver module and it will be described in that context. However, it will be appreciated that the teachings of the present invention are applicable to any electrical device with a removable connection.

Figure 1:
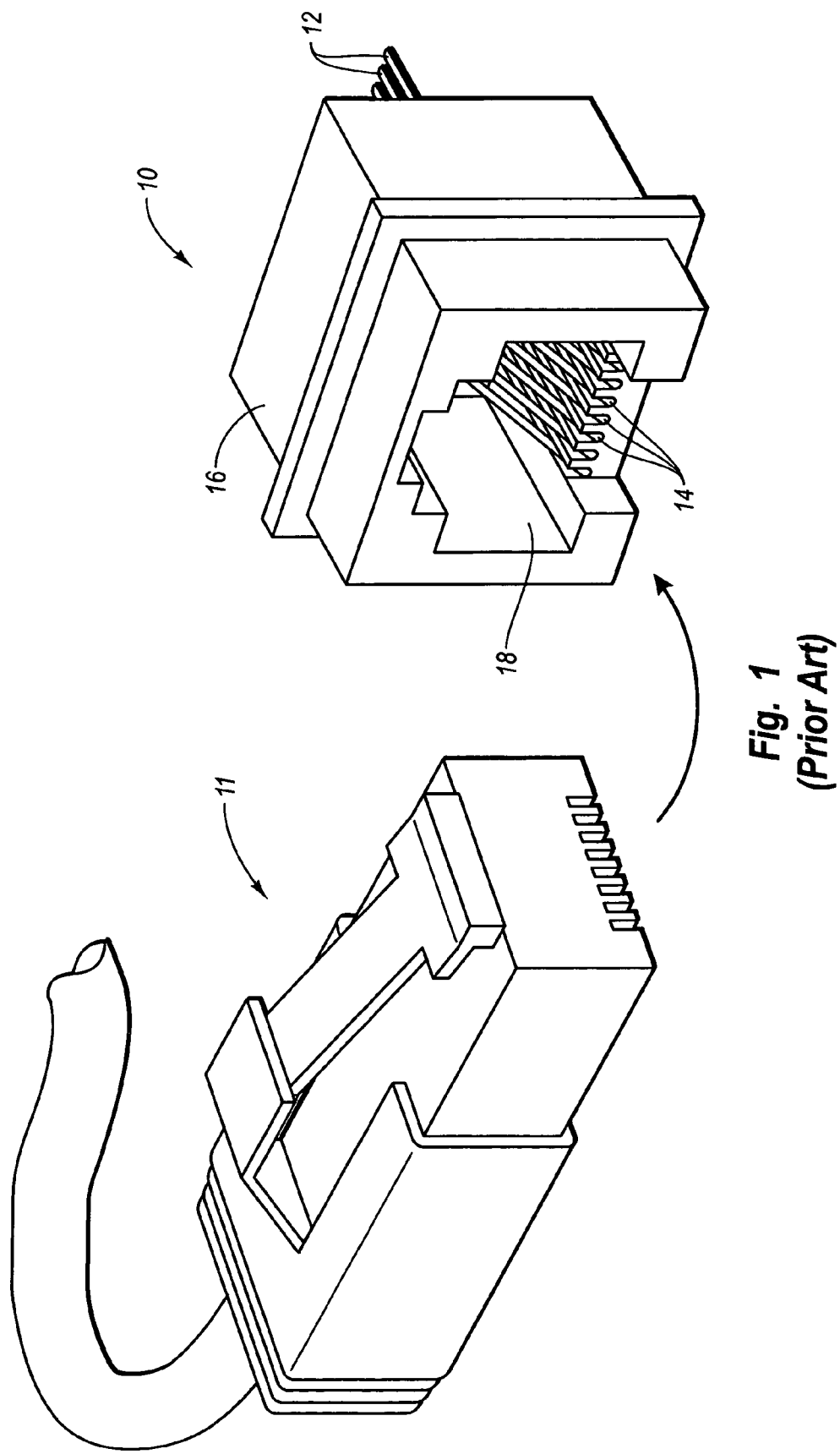
FIG. 1 is a perspective view of a prior art connector that is used to mechanically connect a module to a cable connector.
Figure 2:
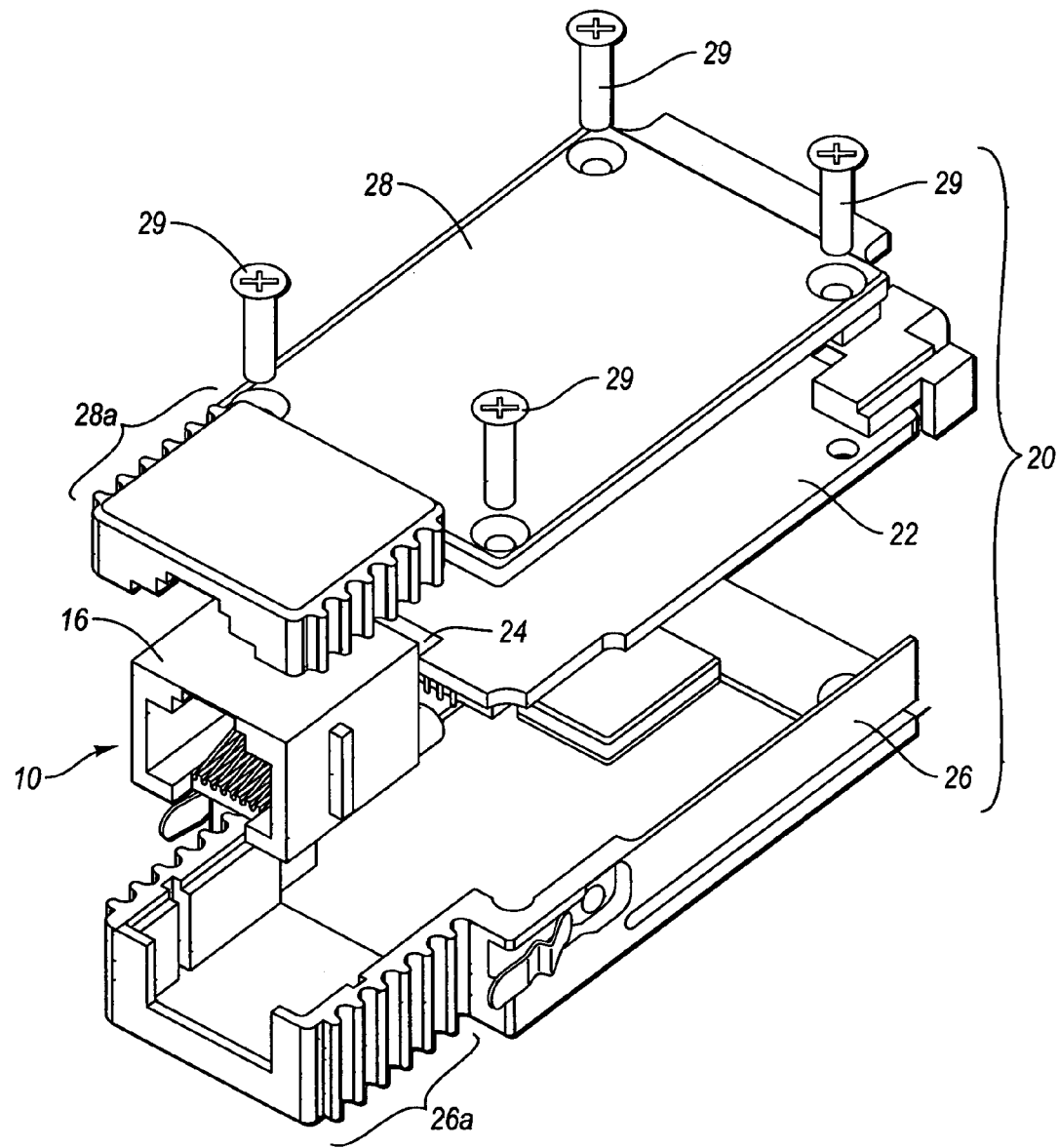
FIG. 2 is an exploded perspective view showing a method of assembling a module using the prior art connector of FIG. 1.
Figure 3:
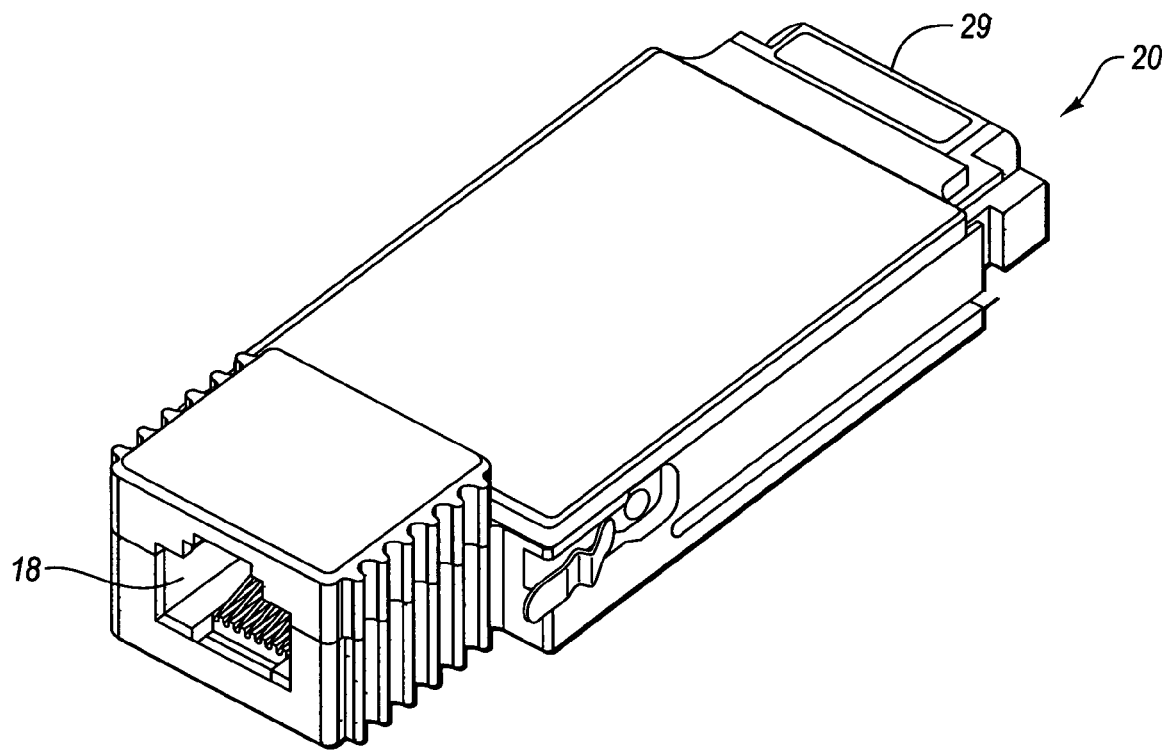
FIG. 3 is a perspective view showing a module assembled in the manner shown in FIG. 2.
Figure 4:
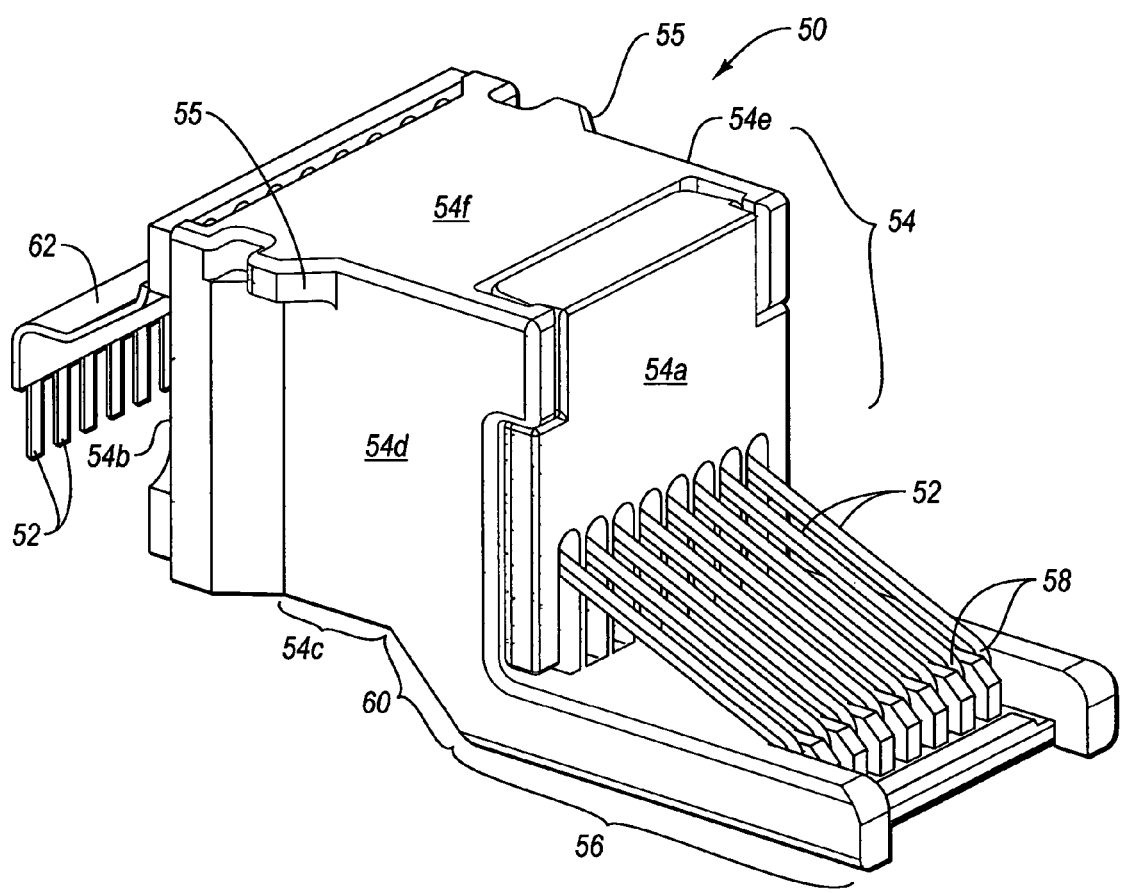
FIG. 4 is a perspective view of a compact connector in accordance with the invention.

FIG. 4 depicts an isometric view of a connector 50 in accordance with the invention. The connector 50 includes electrical leads 52 that are partially enclosed by a plastic housing 54. The plastic housing 54 includes six outer surfaces: a first outer surface 54a from which the electrical leads 52 protrude; a second outer surface 54b on the side that is opposite the first outer surface 54a; and a third, fourth, fifth, and sixth outer surfaces 54c, 54d, 54e, and 54f located in planes that are substantially orthogonal to the plane of the first outer surface 54a. The portion of the plastic housing 54 that is near the third outer surface 54c preferably extends to form an extension 56, which contacts a region 58 of the electrical leads 52 and provides support to the leads 52. The electrical leads 52 are positioned so that they can form and maintain contact with the electrically conductive portions of a cable connector. Unlike the conventional connector jack 10 (see FIG. 1), the leads 52 of the connector 50 are not integrated with a structure that holds a cable connector in place.

An "outer surface," as used herein, refers to a surface that forms a part of the outline of the plastic housing 54. A "plastic housing," as used herein, is a type of enclosure that is made of an electrically nonconductive material including but not limited to plastic. A "cable connector," as used herein, is any type of standard or non-standard component that may be used to connect the leads 52 to a removable cable connector, such as an RJ-45 connector.

Figure 5:
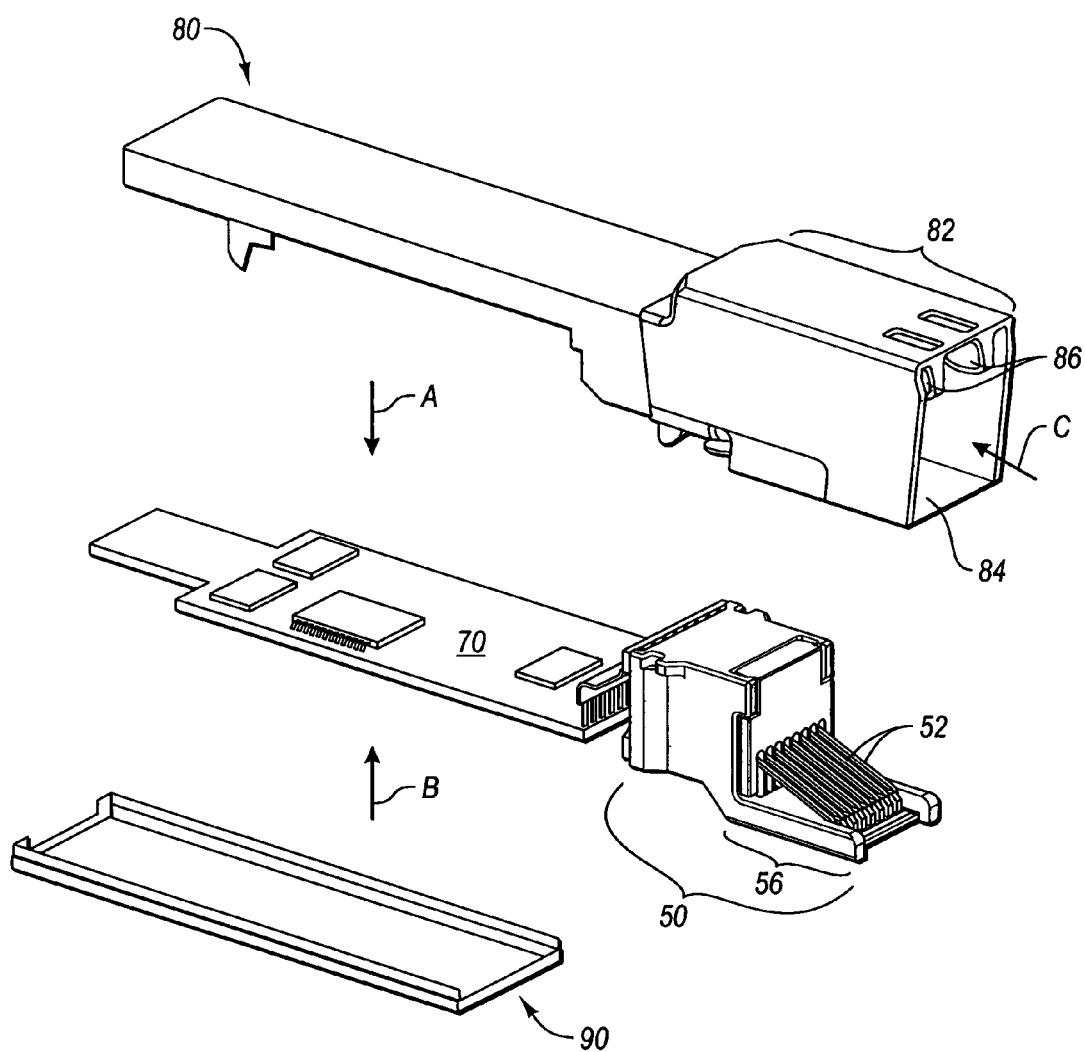
FIG. 5 is an exploded perspective view showing a method of assembling a module using the compact connector of FIG. 4.

A transitional section 60 is preferably located between the third outer surface 54c and the extension 56. The transitional section 60 is sloped so that the extension 56 is separated from the plane of the sixth outer surface 54f by a different distance than the third outer surface 54c. When the connector 50 is assembled into a module, only the extension 56 contacts the module shell (as shown in FIG. 5). Since the outer surface 54c and the transition section 60 do not contact the module shell, a cavity is formed by the third outer surface 54c, the transition section 60, and the module shell that encloses the connector 50. This cavity is necessary for accommodating an optional bail which is described below. In the embodiment shown in FIG. 4, the electrical leads 52 are positioned so that they are at an angle to both the first outer surface 54a and the extension 56. The extension prevents the leads 52 from contacting the module shell that will be positioned near the extension 56.

In the embodiment of FIG. 4, the second outer surface 54b includes portions of the electrical leads 52 that are coupled to a printed circuit board (not shown). Although the embodiment shows a ribbon connector 62 as the means for electrically connecting the leads 52 to a printed circuit board, the invention is not so limited. A person of ordinary skill in the art would appreciate that the invention is not limited to the exact embodiment shown in FIG. 4. For example, the leads 52 are not limited to protruding from the first and second outer surfaces 54a and 54b, respectively, of the connector housing 50, and the shape and the position of the extension 56 may be varied.

FIG. 5 depicts the manner in which the connector 50 is assembled into a module in accordance with the invention. The connector 50 is electrically coupled to a printed circuit board 70 and placed between a first partial shell 80 and a second partial shell 90. The first partial shell 80 has a connector cover 82 that is designed to partially enclose the connector 50. The first partial shell 80 and the second partial shell 90 are made of an EMI-shielding material, such as metal. When the first partial shell 80 and the second partial shell 90 are combined to enclose the printed circuit board 70 and the connector 50 as shown by arrows A and B, the connector 50 is inserted into the connector cover 82 in such a way that the extension 56 rests on the base portion 84 of the connector cover 82. When viewed from the front/network end (indicated by arrow C), the dimensions of the inner walls of the connector cover 82 look substantially similar to the dimensions of the inner walls of cavity 18 (see FIG. 1).

Figure 6:
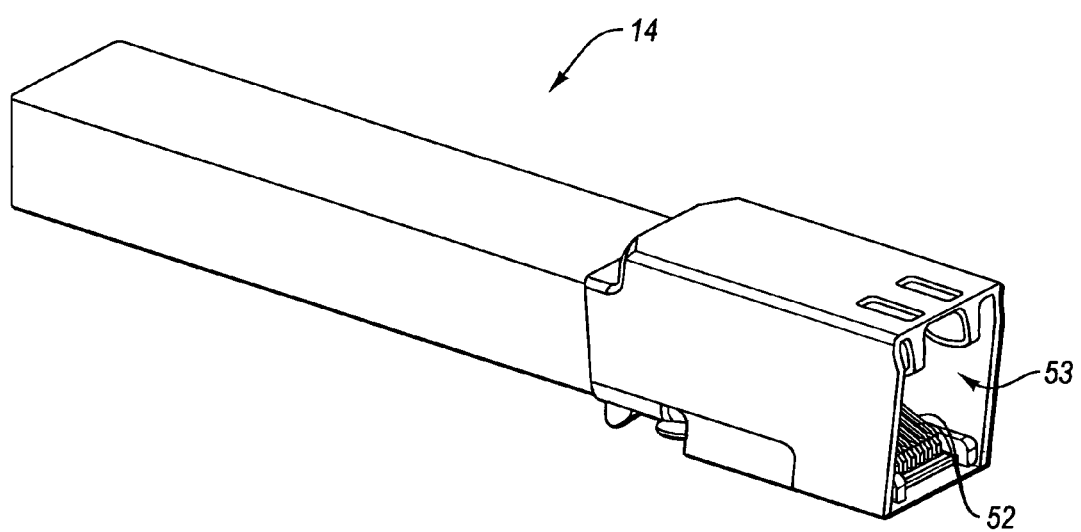
FIG. 6 is a perspective view of a module assembled in the manner shown in FIG. 5.

FIG. 6 depicts a module 94 that is assembled in accordance with the invention. Unlike the GBIC module 20, which includes a conventional connector jack 10 to provide an interface and a separate shell to encapsulate or capture the connector jack 10, both the functions of the connector jack 10 and the functions of the shell are served by the same mechanisms in the module 94. Thus, the connector 50 and the connector cover 82 together form a dual-function network interface device. With mechanical components serving both functions, the dimensions of the module 94 at the network end can be made smaller than the dimensions of the GBIC module 20. As a result, the module 94 can comply with the dimensional standards for a smaller (e.g., SFP) module. If the module 94 is made to comply with the SFP standards which require a smaller printed circuit board, some functionalities may need to be transferred from the printed circuit board in the GBIC module 20 into the connector 50 and the ribbon connector 62 in the module 94. A person of ordinary skill in the art would know of various other measures that can be adopted to further reduce the overall dimensions of the module. These measures include inductive coupling of the cable side with the printed circuit board side of the connector 50, impedance matching of resistors to prevent reflections, and connecting the ground on the cable side with the ground on the printed circuit board side via a high-voltage capacitor, wherein these features are included into the connector 50.

When combined with the connector 50, the connector cover 82 form a cavity 53 with leads 52 positioned therein. The cavity 53, which is similar to the cavity 18 except that it is made of an EMI-shielding material, serves to both hold a cable connector in place and to contain electromagnetic radiation. Protrusions 86 may be formed on one or more inner walls to customize the shape of the cavity 53 to fit the connection component. In the particular embodiment shown, the protrusions 86 are designed to fit along the sides of a "bump" on the standard RJ-45 cable connector (see FIG. 1).

The invention is not limited to the connector 50 or the module shell 80, 90 being made of specific materials. A person of ordinary skill in the art will appreciate that the partial shells 80 and 90 do not have to be made of metal if electromagnetic radiation shielding is not necessary. For example, if the electric components within the module do not generate much radiation, the partial shells 80 and 90 may be made of plastic without deviating from the spirit of the invention.

Figure 7A:
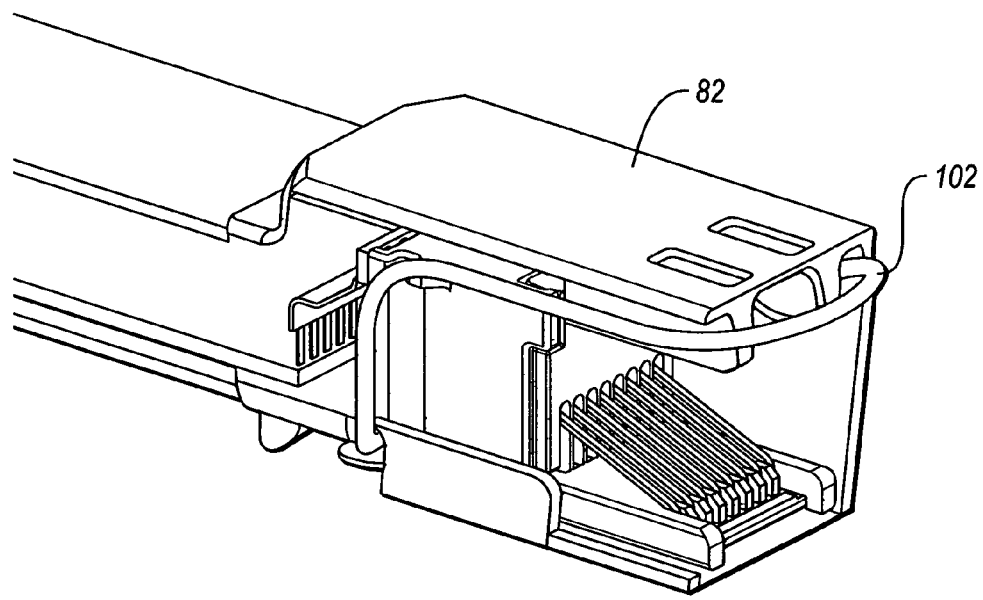
FIG. 7A is a partial perspective view of the module of FIG. 6 including a latching mechanism wherein the module is in an operational mode.
Figure 7B:
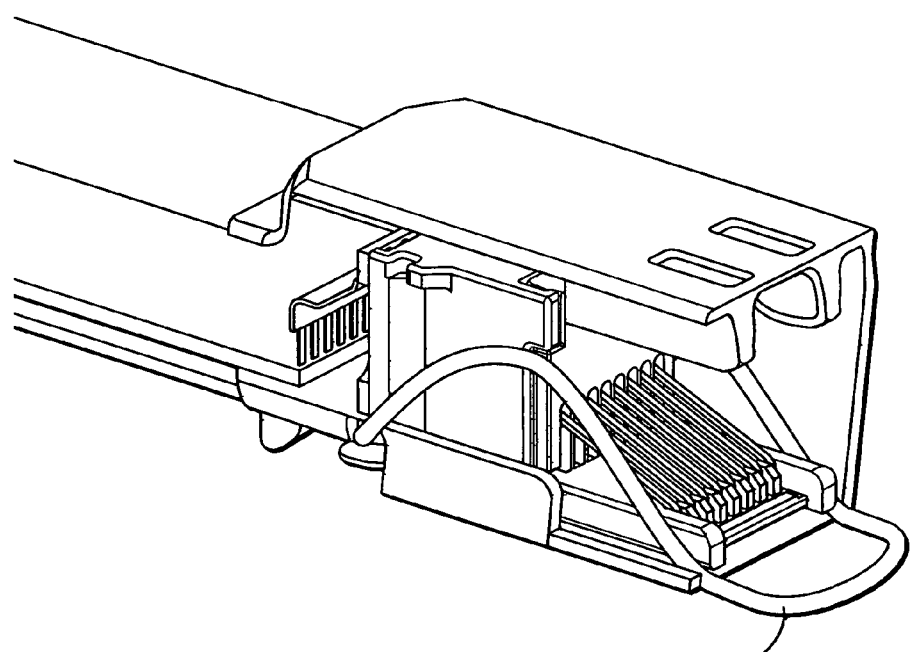
FIG. 7B is a partial perspective view of the module of FIG. 6 including a latching mechanism wherein the module is in a release mode.

Optionally, the module 94 may include a latching mechanism. FIG. 7A and FIG. 7B depict an embodiment of a pluggable module 94 having a latching mechanism that facilitates the unplugging of the module 94 from a host device (not shown). For clarity of illustration, only a part of the connector cover 82 is shown in FIG. 7A and FIG. 7B. The latching mechanism includes a bail 102 that can be placed in different positions and attendant mechanisms for moving the bail 102 between the two positions. Further details about these mechanisms are provided in U.S. Pat. No. 6,439,918, which is incorporated herein. The bail 102 may be used either for securing the module 94 to the host device (see FIG. 7A) or for easy release (see FIG. 7B). The latching mechanism is implemented in such a way that it does not affect the overall dimensions of the module 94. The bail 102 is preferably made of a rigid metal wire and is shaped so that it conforms substantially with the shape of the module 94 when placed in a "latched" position, as shown in FIG. 7A. When the bail 102 is in a "release" position, as shown in FIG. 7B, a portion of the bail 102 protrudes from the module 94 to form a clasp that can be pulled on with a finger to detach the module 94 from the host device. The bail 102 may be configured in any shape that is appropriate for the functions described herein.

Figure 8:
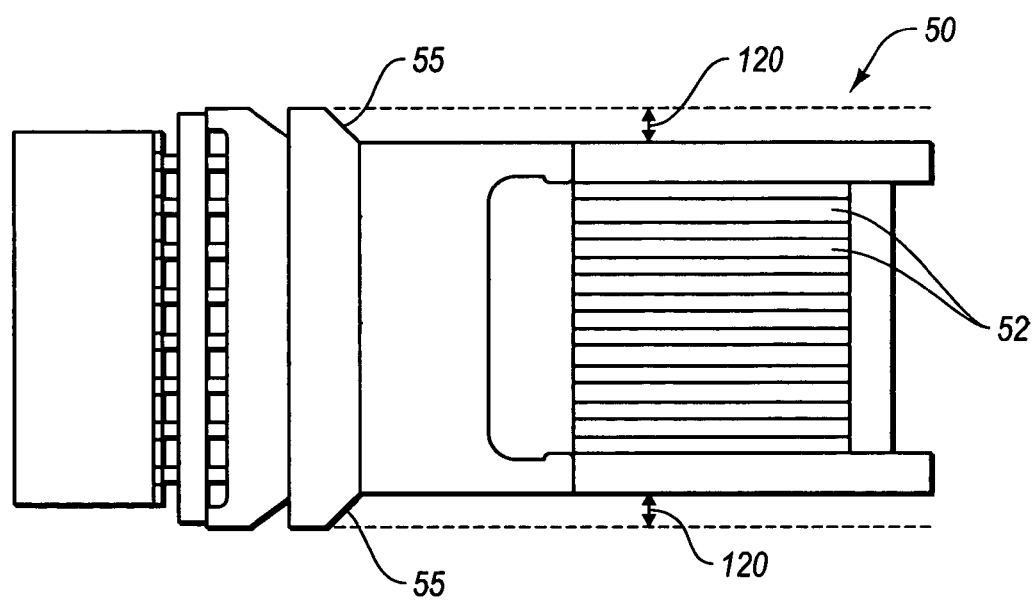
FIG. 8 is a top view of the compact connector used in the module of FIG. 7A and FIG. 7B.

When the latching mechanism is included in the module 94, the connector 50 is designed to accommodate the bail 102 in both the "latch" position and the "release" position, and to ensure a comfortable transition between the two positions. FIG. 8 depicts a top view of the connector 50 clearly showing the waist 55 transitioning the outer surface 54f from a wider width $D_1$ to a narrower width $D_2$. The portion of the connector 50 that are distanced apart by the wider width $D_1$ contacts the inner walls of the connector cover 82 when the module 94 is assembled. However, the portion of the outer surfaces 54d and 54e that are spaced apart by the narrower width $D_2$ do not touch the walls of the connector cover 82, forming a gap 120 for bail clearance. This gap 120, along with the cavity formed by the third outer surface 54c and the transitional section 60 (described above in reference to FIG. 4), accommodates the bail 102.

Figure 9:
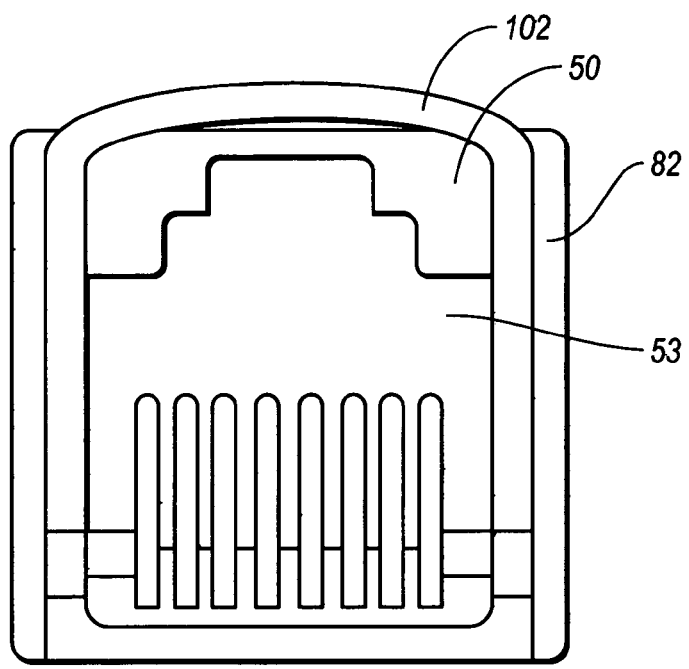
FIG. 9 is an end view of the module of FIG. 7A from the network end.
Figure 10:
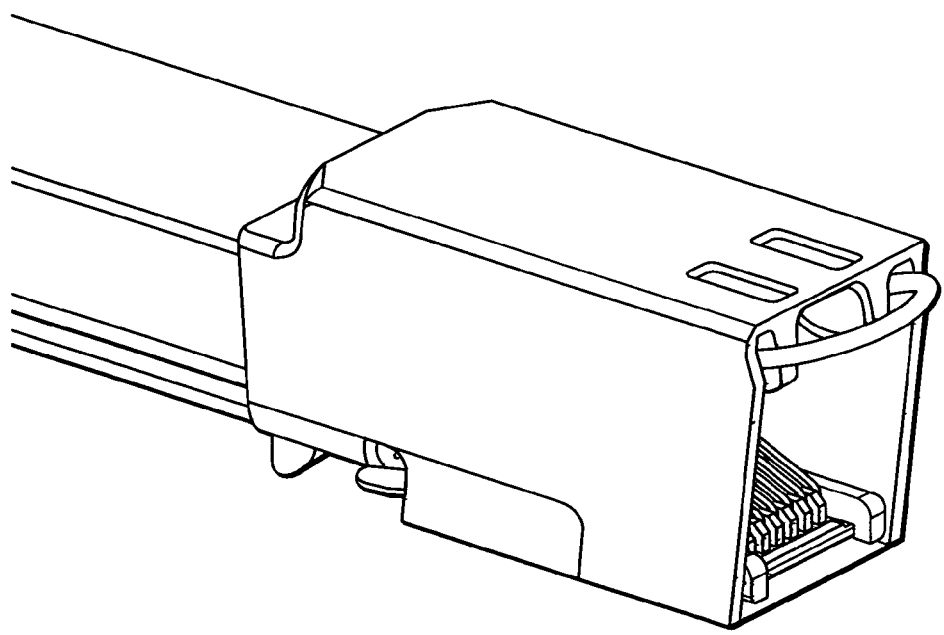
FIG. 10 is a perspective view of the module of FIG. 9 from another angle.

FIG. 9 depicts a view of the assembled module 94 from the front/network end. As shown, parts of the bail 102 fit into the gap 120 between the connector 50 and the connector cover 82. Since the cavity 53 is dimensioned to fit a particular cable connector, the bail 102 might interfere with the cable connector being securely and comfortably being inserted into the cavity 53. Thus, the bail 102 is designed such that when it is in the operational "latched" position, it does not occupy parts of the cavity 53, as shown in FIG. 10. On the other hand, it does not matter if the bail 102 occupies part of the cavity 53 when it is in the "release" position (see FIG. 7B) because it is unlikely that the module 94 will be unplugged or released from the host device while it is still communicating with the host device.

Figure 11:
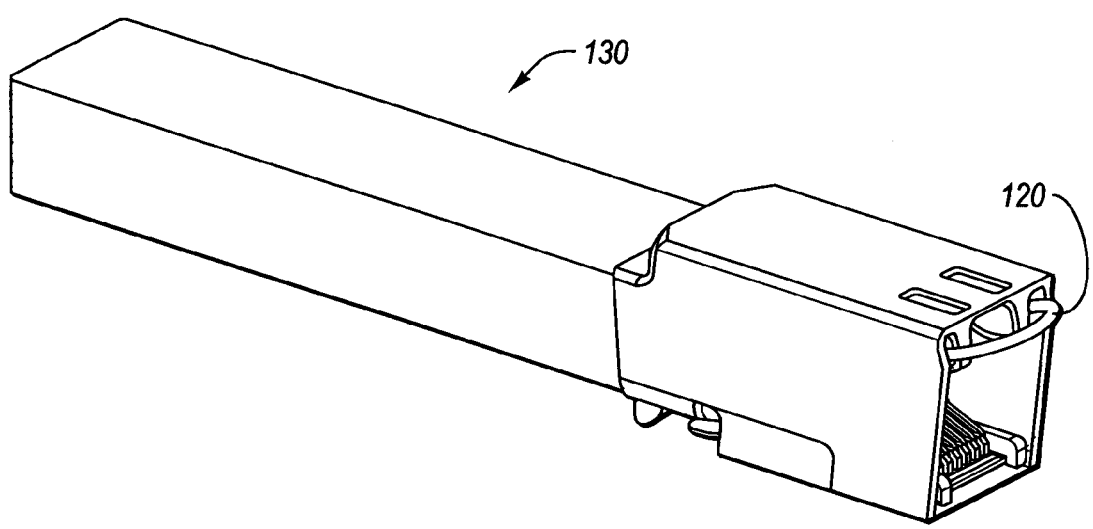
FIG. 11 is a perspective view of a fully assembled module including the latching mechanism and the compact connector in accordance with the invention.

FIG. 11 depicts a completely assembled module 130 including the connector 50 and the latching mechanism in accordance with the invention, wherein the bail 102 in its "latched" position.

A person of ordinary skill in the art would understand that various modifications may be made to the module connector described herein without straying from the scope of the invention.

What is claimed is:

1. An electrical interface module device comprising:
   an electrically conductive lead protruding from a first outer surface of a housing;
   a shell disengageably coupled to the housing so as to form a cavity, wherein the lead is positioned in the cavity and wherein the first outer surface forms an inner wall of the cavity, and wherein the lead protrudes from a second outer surface of the housing;
   electrical components electrically coupled to a portion of the lead protruding from the second outer surface; and
   a bail that facilitates handling of the device, wherein the bail is adjustable between an operational position wherein the bail does not occupy the cavity and a release position wherein the bail occupies a part of the cavity.

2. The device of claim 1 wherein the shell is made of a material that shields electromagnetic radiation.

3. The device of claim 1 wherein the shell is made of an electrically nonconductive material.

4. The device of claim 1 further comprising gaps between the housing and the shell for accommodating the bail.

5. The device of claim 1 wherein the shell partially encloses the protruding lead, the housing, and the electrical components.

6. The device of claim 1 wherein the shell comprises an upper portion and a lower portion that combine to encapsulate the connector housing.

7. An electrical interface module device comprising:
   an electrically conductive lead protruding from a first outer surface of a housing;
   a shell disengageably coupled to the housing so as to form a cavity, wherein the lead is positioned in the cavity and wherein the first outer surface forms an inner wall of the cavity; and
   a second outer surface of the housing that extends to form an extension for supporting the protruding lead, wherein the extension comprises a third outer surface, two substantially parallel surfaces in different planes and a transitional section located between the substantially parallel surfaces.

8. The device of claim 7 wherein the lead is positioned at an angle with respect to both the first outer surface and the extension.

9. The device of claim 7 wherein at least a part of the extension is positioned between the protruding lead and the shell.

10. The device of claim 7 wherein only the extension contacts the shell, forming a gap between the third outer surface and the shell.

11. A method of connecting electrical components to a network, the method comprising:
- partially enclosing an electrical lead with a shell, wherein the shell is shaped to hold a cable connector in contact with the electrical lead, and
- adjusting a bail between an operational position wherein the bail does not occupy the cavity and a release position wherein the bail occupies a part of the cavity.

12. The method of claim 11 wherein the shell is made of metal.

13. The method of claim 11 wherein the electrical components are located on a printed circuit board.

14. The method of claim 11 wherein the partial enclosure comprises combining a first partial shell and the second partial shell to surround a plastic surface from which the electrical lead protrudes.

15. The method of claim 14 wherein the plastic surface and the shell form a cavity into which a cable connector is inserted.

16. The method of claim 14 wherein the plastic surface is part of a plastic housing that houses a portion of the electrical lead, further comprising leaving a gap between a portion of the plastic housing and the shell to accommodate a bail.

17. The method of claim 11 further comprising positioning an electrically nonconductive layer between the electrical lead and the shell.

18. The method of claim 17 further comprising positioning the electrical lead at an angle with respect to both the plastic surface and the electrically nonconductive layer.

19. A transceiver module comprising:
- a lead electrically coupled to a printed circuit board;
- a metal shell designed to hold a cable connector in contact with the lead; and
- a bail that facilitates handling of the transceiver module, wherein the bail is adjustable between an operational position wherein the bail does not occupy the cavity and a release position wherein the bail occupies a part of the cavity.

20. A transceiver module comprising:
- a support housing;
- an electrical lead protruding from a first outer surface and a second outer surface of the support housing;
- an extension plane extending from the support housing to contact the electrical lead protruding from the first outer surface;
- electrical components connected to the electrical lead protruding from the second outer surface;
- a bail that facilitates handling of the transceiver module, wherein the bail is adjustable between an operational position wherein the bail does not occupy the cavity and a release position wherein the bail occupies a part of the cavity; and
- a shell enclosing the support housing and the electrical lead and forming a cavity.

* * * * *